May 21, 1968     J. D. McHUGH     3,384,427
INTEGRAL FLUID-FILM MAGNETIC BEARING
Filed Aug. 27, 1964
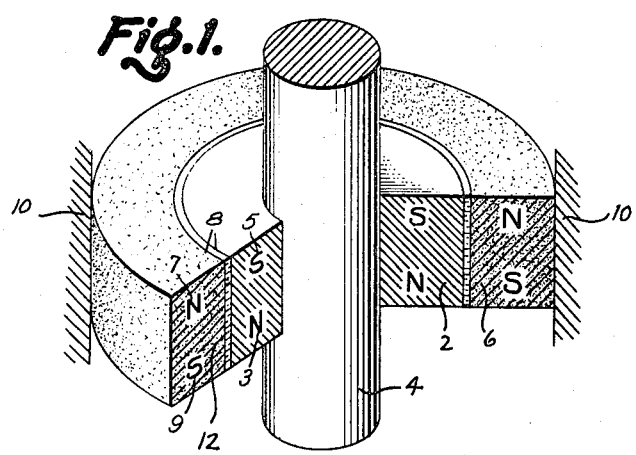
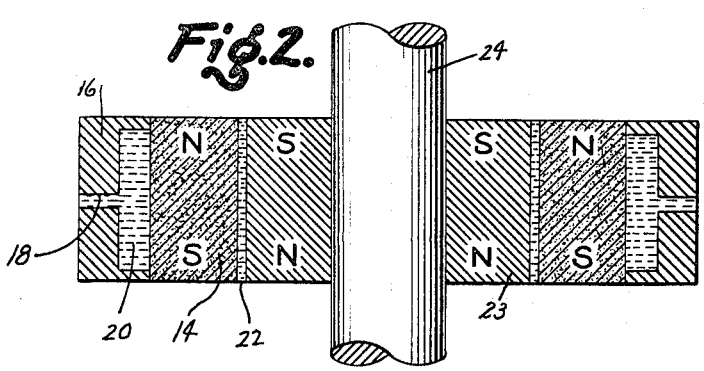
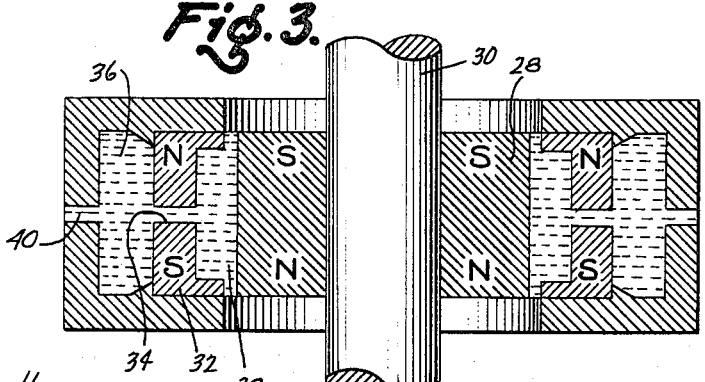
Inventor
James D. McHugh,
by Paul A. Frank
His Attorney

United States Patent Office 3,384,427
Patented May 21, 1968

3,384,427
INTEGRAL FLUID-FILM MAGNETIC BEARING
James D. McHugh, Schenectady, N.Y., assignor to General Electric Company, a corporation of New York
Filed Aug. 27, 1964, Ser. No. 392,470
9 Claims. (Cl. 308—10)

ABSTRACT OF THE DISCLOSURE

An integral fluid film magnetic bearing assembly for a rotating shaft having provision for magnetization in the axial direction to oppose a thrust load. A magnetized cylindrical stator surface envelops a cylindrical permanent magnet attached to the shaft, the magnetic poles of the permanent magnet being opposed to the poles in the outer porous magnetized surface and lubricant being admitted to the bearing interface either through the pores or an opening in the outer cylinder.

---

My invention relates to bearings and, more particularly, to an integral bearing for supporting a radial and thrust load simultaneously.

In the utilization of modern equipment, the need arises for the provision of bearings that can support rotating shafts under a radial and thrust loading at the same time. With the present trend towards equipment that utilizes the least possible space, the need arises for a bearing that support loads applied in more than one direction.

In many applications, especially those of rotating shafts, bearings are required to support thrust loads while separate bearings are required for radial loads. This requires extensive space and becomes very unwieldy in areas where space is at a premium. A typical example would be in the case of a fan where journal bearings are required to sustain the weight of the rotor assembly and separate thrust bearings are required to resist the axial force caused by fan thrust. This requires two separate bearings, one for the general radial load and the other for the thrust load. The need then arises for an integral bearing, one that can sustain both axial and radial loads within the same bearing assembly.

There is also a need in the industry for a bearing that supports both thrust and radial loads and is lubricated within itself without resort to exterior lubrication equipment. Such a bearing has the lubricant contained within it, to obviate the need for supplying lubricant during operation of the bearing.

My invention envisions a bearing for simultaneously supporting combined radial and axial loading on a rotatable member.

The chief object of my invention is the provision of an integral bearing having a fluid film means for supporting radial loads and a magnetic means for supporting thrust loads; both acting simultaneously in combination as one bearing structure.

Another object of my invention is the provision of an integral bearing whereby the magnetic means for supporting thrust loads also forms a channel for a fluid wherein radial loads are supported.

Another object of my invention is the provision of self-contained means for supplying lubricant to the radial load carrying means of a bearing.

A further object of my invention is the provision of a porous member, through which lubricant is supplied to a radial load carrying means of a bearing, the porous member also aiding in supporting thrust loads.

These and other objects of my invention will be more readily perceived from the description which follows.

One of the features of my invention is a highly efficient integral bearing having fluid film radial load carrying means and magnetic axial load carrying means which both act in conjunction to support a combined radial and axial load on a member at the same time.

The drawings illustrate preferred embodiments of my invention in which:

FIGURE 1 is a perspective view of the bearing of my invention;

FIGURE 1a is a cross-sectional view of a modified form of the bearing of FIGURE 1;

FIGURE 2 is a cross-sectional view of a further modified form of the bearing of FIGURE 1;

FIGURE 3 is a view of a still further modification of the bearing of FIGURE 1.

In FIGURE 1 there is shown a view of the bearing embodying my invention. The construction includes magnetically attractive member 2 which is permanently secured to rotatable shaft 4. Member 2 is cylindrical in shape and fits securely around shaft 4 on which the load, desired to be supported, is applied. Surrounding member 2 is cylindrical magnetically attractive member 6 spaced from member 2 to form channel 8 in which lubricant flows. Member 6 is secured to outer wall 10 defining the opening in which shaft 4 rotates.

In the mode of FIGURE 1 both magnetically attractive members 2 and 6 are magnets. Magnet 2 has its South pole 5 opposite North pole 7 of magnet 6 and vice versa to provide an attractive force across channel 8 between magnets 2 and 6. This attractive force proceeds according to the well known principle that opposite poles of magnets attract and like poles repel.

Movement of shaft 4 in an axial direction displaces magnet 2 to a position where its North pole 3 approaches North pole 7 of magnet 6 or its South pole 5 approaches South pole 9 of magnet 6 causing a repelling force therebetween to bring the opposite poles in alignment again and thereby support the axial load on shaft 4.

In operation, magnet 6 which is constructed of a porous metallic material is impregnated with a lubricant. This lubricant is preferably a fluid of the liquid category such as oil. As shaft 4 rotates magnet 2 being secured thereto rotates to cause a shear drag force on the fluid in area 8 between magnets 2 and 6, resulting in a pressure variation against surface 12 of magnet 6 to draw lubricant from within magnet 6 into area 8 for providing fluid film lubrication in channel 8. This drawing or hydrodynamic force provides the necessary lubrication within channel 8 to sustain radial loads on shaft 4. Pressurized lubricant fills channel 8 surrounding shaft 4 to form a cushion on which shaft 4 rides to absorb radial loads applied thereto. As aforementioned, thrust loads on shaft 4 are supported by magnets 2 and 6 which have their respective South and North poles adjacent each other, resulting in an attractive force therebetween. As a thrust load is applied, the opposite South poles 5 and 9 and North poles 3 and 7 of magnets 2 and 6 that are adjacent each other are separated, causing the already existing attractive force between the magnets to tend to restore the magnets to the position they were in before the thrust load was applied. This tends to return shaft 4 to its former position and thereby fully supports the applied thrust load.

It is noted that besides the attractive force between the opposite poles of magnets 2 and 6, there is a repulsive force between like poles of magnets 2 and 6 so that as the thrust load is applied to shaft 4, in either axial direction, either South poles 5 and 9 or North poles 3 and 7 of magnets 2 and 6 are brought close to each other, and since like magnetic poles repel each other, a repelling force is effectuated tending to restore the shaft to the position it was in before the thrust load was applied. Therefore, with the fluid film supporting radial loads and the magnets supporting thrust loads, shaft 4 is effectively supported with a combined load thereon.

Alternatively, as shown in FIGURE 1a either magnet of FIGURE 1 is of a magnetically attractive material, e.g., iron, but is not a magnet, while the other member is a magnet. Axial thrust loads are supported by the restoring force of magnetic member 11 drawing magnetically attractive member 13 back to the position of highest permeance, the position where it was orginally located. The tendency when either member is displaced is then to return to its original position thereby effectively supporting axial thrust loads on shaft 4. It is noted that this mode of the bearing operates in the same manner as the mode of FIGURE 1 to effectively support axial and thrust loads on a rotatable shaft.

FIGURE 2 illustrates a modification of the invention of FIGURE 1. The basic principles are the same except that magnetically attractive member or magnet 14 which corresponds to magnet 6 of FIGURE 1 is porous in the same manner as magnet 6 but is not impregnated with the lubricant before the bearing is placed in operation. Instead, a pressurized fluid is pumped into area 20 in housing 16 by way of channel 18. From here, the lubricant passes through the porous magnet 14 to provide the fluid film in channel 22 as it does in channel 8 in FIGURE 1.

In the mode of FIGURE 2 an outside source of fluid is employed, which source is either gas or liquid, to form a fluid film in channel 22 for supporting radial loads on shaft 24. It is then seen that radial loads on shaft 24 are supported in the same manner as radial loads on shaft 4 in FIGURE 1. It will be appreciated that magnet 23 on shaft 24 operates in the same manner as magnet 2 on shaft 4 of FIGURE 1 to support axial thrust loads thereon. It is noted that by the structure of FIGURE 2, a constant pressure of fluid can be applied which fluid passes through magnet 14 and into area 22 by a hydrostatic force, which functions regardless of the drag caused by the rotation of shaft 24. In fact, shaft 24 needs no rotation to be effectively supported by the mode of FIGURE 2, since the lubricant is forced into channel 22 and is not dragged in by rotation of shaft 24.

In the modification of FIGURE 3 magnetically attractive member or magnet 28 and shaft 30 operate in the same way as magnet 2 and shaft 4 of FIGURE 1. In place of permeable magnet 6 of FIGURE 1 there is solid nonporous magnetically attractive member or magnet 32. Through opening 34 in magnet 32 the gas or liquid lubricant is supplied from area 36 into lubrication channel 38 to provide the radial supporting function of the bearing. Lubricant is supplied into area 36 in this same manner as in FIGURE 2, that is, through channel 40. This bearing operates in the same manner as the bearings of the prior figures with the exception that because magnets 32 are solid, channel 34 is provided to supply lubricant quickly to channel 38 to provide the radial supporting function of the bearing. This structure, as with the structure of FIGURE 1 thereby supports both radial and axial thrust loads in a single integral bearing.

It is noted that the magnet attached to the shaft in any of the illustrations is a permanent magnet of a solid nonporous material. This as meant to be illustrative of the modes of my invention that are illustrated and is not intended in a limiting sense, since any magetically attractive material may be employed.

It will be appreciated that either of the two magnets of FIGURES 2 or 3 may be replaced by a magnetically attractive material that is not a magnet, as described with the mode of FIGURE 1a, and operation of the bearing will be the same.

It is now apparent that the invention attains the objects set forth. Apparatus embodying the invention is sturdy in construction and well adapted for use in conjunction with various environments. The integral operation permits the support of both radial and thrust loads at the same time with the utmost efficiency and ease of operation.

Specific embodiments of my invention have been illustrated, but my invention is not limited thereto since many modifications may be made by one skilled in the art, and the appended claims are intended to cover all such modifications as fall within the true spirit and scope of my invention.

What I claim as new and desire to secure by Letters Patent of the United States is:

1. A bearing for a rotatable member comprising
   a first magnetically attractive member secured to the rotatable member, and
   a second magnetically attractive member spaced from and encircling said first magnetically attractive member to provide a channel therebetween for containing a pressurized fluid for supporting radial loads, and said second attractive means having magnetic poles aligned with the poles of said first attractive means to produce an attractive force therebetween for supporting axial thrust loads.

2. A bearing for a rotatable member as in claim 1 wherein said first magnetically attractive member is an annular magnet having poles in the axial direction of the rotatable member.

3. A bearing for a rotatable member as in claim 1 wherein said second magnetically attractive member is an annular magnet having poles in the axial direction of the rotatable member.

4. A bearing for a rotatable member comprising
   a first annular magnet having North and South poles at its ends and secured to the rotatable member, and
   a second annular magnet in a stationary position surrounding said first magnet and having North and South poles at its ends aligned with the North and South poles of said first magnet to form an attractive force therebetween for supporting axial thrust loads on said rotatable member, said second magnet being spaced from said first magnet to provide a channel therebetween for a pressurized fluid to support radial loads on the rotatable member.

5. A bearing for a rotatable member comprising
   a first cylindrical magnet having North and South poles at its two ends secured to the rotatable member, and
   a second cylindrical magnet surrounding said first magnet to form a channel therebetween for a pressurized fluid to support radial loads on said rotatable member, said second magnet being in a stationary position, and having North and South poles at its two ends so aligned that the South pole is adjacent the North pole of the first magnet and the North pole is adjacent the South pole of the first magnet to form an attractive force therebetween for supporting axial thrust loads on the rotatable member.

6. A bearing for a rotatable member comprising
   a stationary member,
   a first cylindrical magnet having North and South poles at its opposite ends secured to the rotatable member,
   a second cylindrical magnet of porous material for retaining a lubricant, secured to said stationary member, surrounding said first magnet to form a channel therebetween, said channel adapted to contain pressurized fluid from said porous magnet for supporting radial loads, and said second magnet having North and South poles at its opposite ends and so aligned that its South pole is adjacent the North pole of the first magnet and its North pole is adjacent the South pole of the first magnet to form an attractive force therebetween for supporting axial thrust loads on the rotatable member.

7. A bearing for a rotatable shaft comprising
   a stationary member surrounding the rotatable shaft,
   a first cylindrical magnet having North and South poles at its opposite ends secured to the rotatable shaft, a second cylindrical magnet secured to said stationary member, surrounding said first magnet to form a channel therebetween and having North and South poles at its opposite ends and so aligned that the South pole of said second magnet is adjacent the North pole of the first magnet and the North pole of said second magnet is adjacent the South pole of said first magnet to form an attractive force therebetween for supporting axial thrust loads on the rotatable member, and means for placing a fluid in said channel to form a film for supporting radial loads on the rotatable member.

8. A bearing for a rotatable shaft comprising a stationary member, a first cylindrical magnet having North and South poles at its opposite ends secured to the rotatable member, a second cylindrical magnet of porous material for retaining a lubricant secured to said stationary member and surrounding said first magnet to form a channel therebetween, said channel adapted to contain pressurized fluid from said porous magnet for supporting radial loads on the shaft and having North and South poles at its ends so aligned that its South pole is adjacent the North pole of the first magnet and its North pole is adjacent the South pole of the first magnet to form an attractive force therebetween for supporting axial thrust loads on the rotatable shaft, and means for placing a fluid within said porous magnet for distribution from said porous magnet to form a film in said channel for supporting radial loads on the rotatable shaft.

9. A bearing for a rotatable shaft comprising a stationary member surrounding the rotatable shaft, a first cylindrical magnet having North and South poles at its opposite ends secured to the rotatable shaft, a second cylindrical magnet of nonporous material secured to said stationary member and surrounding said first magnet to form a channel therebetween, said channel adapted to contain pressurized fluid for supporting radial loads on the shaft, and said second magnet having North and South poles aligned so that its South pole is adjacent the North pole of the first magnet and its North pole is adjacent the South pole of the first magnet to form an attractive force therebetween for supporting axial thrust loads on the rotatable shaft, and means for placing a fluid through said second magnet to form a film in said channel for supporting radial loads on the rotatable shaft.

References Cited
UNITED STATES PATENTS

| | | | |
|---|---|---|---|
| 2,998,999 | 9/1961 | Morser et al. | 310—90 |
| 3,134,037 | 5/1964 | Upton | 310—90 |
| 2,254,698 | 9/1941 | Hansen | 308—10 |
| 2,311,382 | 2/1943 | Hansen | 308—10 |
| 2,436,939 | 3/1948 | Schug | 308—10 |
| 2,560,260 | 7/1951 | Sturtevant et al. | 308—10 |

MILTON O. HIRSHFIELD, *Primary Examiner.*

L. L. SMITH, *Assistant Examiner.*